United States Patent
Galeotti et al.

(10) Patent No.: US 9,488,784 B2
(45) Date of Patent: Nov. 8, 2016

(54) REDUCED LENGTH OPTOELECTRONIC DEVICES

(75) Inventors: Roberto Galeotti, Giussago (IT); Mario Bonazzoli, Cremona (IT); Nicola Rettani, Voghera (IT)

(73) Assignee: OCLARO TECHNOLOGY LIMITED, Northamptonshire (GB)

( * ) Notice: Subject to any disclaimer, the term of this patent is extended or adjusted under 35 U.S.C. 154(b) by 381 days.

(21) Appl. No.: 13/578,242

(22) PCT Filed: Feb. 7, 2011

(86) PCT No.: PCT/GB2011/050205
§ 371 (c)(1),
(2), (4) Date: Oct. 1, 2012

(87) PCT Pub. No.: WO2011/098787
PCT Pub. Date: Aug. 18, 2011

(65) Prior Publication Data
US 2013/0034328 A1 Feb. 7, 2013

(30) Foreign Application Priority Data
Feb. 10, 2010 (GB) .................................. 1002231.7

(51) Int. Cl.
*G02B 6/30* (2006.01)
(52) U.S. Cl.
CPC ....................................... *G02B 6/30* (2013.01)
(58) Field of Classification Search
None
See application file for complete search history.

(56) References Cited

U.S. PATENT DOCUMENTS

| | | | | |
|---|---|---|---|---|
| 5,050,953 A | * | 9/1991 | Anderson et al. | 385/89 |
| 5,247,530 A | * | 9/1993 | Shigeno | G02B 6/4248 372/36 |
| 5,305,336 A | * | 4/1994 | Adar et al. | 372/18 |
| 5,812,716 A | * | 9/1998 | Ohishi | G02B 6/02176 385/37 |
| 5,875,274 A | * | 2/1999 | Stein | G02B 6/4212 372/50.1 |
| 5,917,648 A | * | 6/1999 | Harker | 359/341.3 |
| 5,925,572 A | * | 7/1999 | Byrne et al. | 436/163 |
| 6,712,528 B2 | | 3/2004 | Galeotti et al. | |
| 6,769,819 B2 | * | 8/2004 | Tanaka | G02B 6/4226 385/92 |
| 7,066,658 B2 | | 6/2006 | Lane | |

(Continued)

FOREIGN PATENT DOCUMENTS

| | | |
|---|---|---|
| DE | 10-2007-022852 A1 | 11/2008 |
| EP | 1528417 A2 | 5/2005 |

(Continued)

OTHER PUBLICATIONS

GB search report for application No. GB1002231.7 dated Jun. 8, 2010.

(Continued)

*Primary Examiner* — Tina Wong
(74) *Attorney, Agent, or Firm* — Fenwick & West LLP

(57) ABSTRACT

There is described an optoelectronic device having a housing and a chip housed by the housing. At least a portion of the chip protrudes through an aperture in a wall of the housing. There is further provided an optoelectronic module comprising such an optoelectronic device and electronic control circuitry adapted to control the operation of the optoelectronic device.

7 Claims, 4 Drawing Sheets

(56) References Cited

U.S. PATENT DOCUMENTS

| | | | |
|---|---|---|---|
| 7,161,725 | B2 | 1/2007 | Fraser et al. |
| 7,228,014 | B2 | 6/2007 | Gilardi et al. |
| 8,774,568 | B2 * | 7/2014 | Han .................... G02B 6/4206 385/14 |
| 2002/0130403 | A1 * | 9/2002 | Onodera et al. .............. 257/680 |
| 2004/0022501 | A1 * | 2/2004 | Lam .................... G02B 6/4248 385/92 |
| 2005/0175299 | A1 | 8/2005 | Hargis et al. |
| 2005/0201653 | A1 | 9/2005 | Gilardi et al. |
| 2006/0062526 | A1 | 3/2006 | Ikeuchi |
| 2006/0072881 | A1 * | 4/2006 | Schunk ................ G02B 6/305 385/92 |
| 2006/0104575 | A1 * | 5/2006 | Ikeda ................... G02B 6/4204 385/88 |
| 2007/0091300 | A1 | 4/2007 | Hall |
| 2007/0140621 | A1 * | 6/2007 | DeCusatis ........... G02B 6/3887 385/53 |
| 2007/0147746 | A1 * | 6/2007 | Adams et al. ................. 385/92 |
| 2007/0153857 | A1 | 7/2007 | Chua et al. |
| 2007/0230855 | A1 * | 10/2007 | McDonald ....... H04B 10/25133 385/5 |
| 2008/0025677 | A1 * | 1/2008 | Sasaki .................... G02B 6/30 385/94 |
| 2010/0133631 | A1 | 6/2010 | Benzel |

FOREIGN PATENT DOCUMENTS

| | | | |
|---|---|---|---|
| GB | 2146841 | A | 4/1985 |
| GB | 2225124 | A | 5/1990 |
| JP | 50-06646 | U | 1/1975 |
| JP | S62-187304 | A | 8/1987 |
| JP | 01-155010 | U | 10/1989 |
| JP | 02-244012 | A | 9/1990 |
| JP | 06-300942 | A | 10/1994 |
| JP | 2000-131658 | A | 5/2000 |
| JP | 2002-118271 | A | 4/2002 |
| JP | 2002118271 | * | 4/2002 ............ H01L 31/02 |
| JP | 2002118271 | A | 4/2002 |
| JP | 2004294746 | A | 10/2004 |
| JP | 2004327685 | A | 11/2004 |
| JP | 07-027949 | A | 2/2007 |
| JP | 2009237196 | A | 10/2009 |
| WO | 2004025362 | A1 | 3/2004 |

OTHER PUBLICATIONS

International search report for application No. PCT/GB2011/050205 dated May 3, 2011.
Translation for Second Notification of Office Action for Chinese Patent Application No. CN 201180008857.2, Sep. 9, 2014, 9 Pages.
Communication Pursuant to Article 94(3) EPC for European Patent Application No. EP 11703259.9, Jul. 10, 2015, 4 Pages.

* cited by examiner

REDUCED LENGTH OPTOELECTRONIC DEVICES

FIELD OF INVENTION

The present invention relates to optoelectronic devices comprising optoelectronic chips within housings, and in particular such optoelectronic devices for integration into optoelectronic modules.

BACKGROUND TO THE INVENTION

Optoelectronic devices such as transmitters and receivers commonly comprise an optoelectronic chip within a housing (the "package"). The chip is optically coupled to an input and/or an output optical fibre that passes through a wall of the housing. Between the optical fibre and chip there may be intervening bulk optical components, such as lenses, optical splitters, and optical isolators. The chip may be an optoelectronic modulator, such as a Mach-Zehnder modulator chip or an electro-optic absorption modulator chip. Alternatively the chip may be another optoelectronic chip, such as a semiconductor laser chip or a photodetector chip.

The housing provides protection to the chip and other components from mechanical damage during higher level assembly into modules, transport or connection into an optical communications network. Further, the housing is typically sealed and provides environmental protection from ambient humidity, chemical degradation and light. In many cases the housing may be hermetically sealed to provide the highest level of environmental protection. U.S. Pat. No. 7,066,658 discloses an arrangement by which the optical fibre passing into a housing may be hermetically sealed directly to the inside of an opening through a wall of the housing. U.S. Pat. No. 6,712,528 discloses an arrangement in which an optical fibre entering a housing is hermetically sealed into a ferrule which also passes through the opening in the housing wall, the ferrule is hermetically sealed onto a protective snout, and the snout is in turn hermetically sealed to the outside wall of the housing, around the opening.

The housing also provides a robust body to which both the chip and other components may be connected, such as bulk optical components and a thermo-electric cooler (which may be connected between a chip and the internal floor of the housing). In particular, the housing provides a robust fixture to which the optical fibre is connected.

Frequently the applications within which such components are deployed are size sensitive, with requirements to minimize the "footprint" of the housing. This can be particularly important when the housed device is integrated into a higher level optoelectronic module, e.g. a transmitter, receiver or transponder module that is provided with electronic control circuitry for the housed device.

Attention to the reduction of the size of componentry within optoelectronic housings has to date focused on the reduction in size of bulk optical components within the housing. U.S. Pat. No. 7,161,725 and US2007/0091300 disclose reduced footprint bulk optical components. However, reduction in the size of the components within a housing can only achieve a limited reduction in the corresponding size of the footprint of the housing required to contain them. Similarly, the reduction in the size of the other components within a housing can only provide a limited amount of extra space to facilitate the use of a longer chip. In particular, such reductions in the size of bulk optical components can only achieve limited reduction in the corresponding length of the housing, or a limited increase in the length of the optoelectronic chip that can be housed within a housing matching an existing footprint. Further, the requirement for access into the housing by alignment apparatus that positions some of the components also limits the possible reduction in the width of the housing.

Two different arrangements are known for optically coupling an optical fibre to the optical waveguide of an optoelectronic chip.

In a first known arrangement, known as "butt-coupling", the optical fibre passes in through the housing wall and the end of the fibre is connected to the chip. The fibre end may abut the chip, being directly bonded onto the chip by means of optical adhesive, such as optical resin. Alternatively, an optical coupling element may be provided bonded to the end of the optical fibre, and the optical coupling element is bonded to the chip, such that both the optical fibre and optical coupling element are butt-coupled to the chip. Such an optical coupling element may be a short homogenous cylinder of glass, and facilitates handling of the fibre end during the alignment stage of device assembly. U.S. Pat. No. 7,228,014 discloses the use of an optical coupling element in the butt-coupling of an optical fibre to a chip.

When butt-coupled to a chip, an optical fibre is only required to be aligned in two dimensions, being the orthogonal directions in the plane of the bonding surface of the chip. Disadvantageously, alignment of the optical fibre end within the housing requires a minimum housing width, such that fibre end alignment equipment can grasp and manoeuvre the fibre end within the housing. FIG. 1 illustrates a device according to this first known arrangement, showing a cross-sectional view through the device in the plane of the optoelectronic chip and optical fibre.

In a second known arrangement, known as "air-lens alignment", an optical lens is bonded into an opening in the wall of the housing, and the chip and the optical fibre are aligned on opposite sides of the lens, such that light from one is focused onto the other by the lens. In such an arrangement the chip may be connected to the floor of the housing, following which the fibre end is aligned in three dimensions to a corresponding position on the other side of the lens. A separation is required between the chip and the lens for correct focusing of light passing between the chip and optical fibre, and in the air-lens alignment arrangement, where the lens is in the housing wall, that separation is provided within the housing, which disadvantageously increases the length of the required housing. FIG. 2 illustrates a device according to this second known arrangement, showing a cross-sectional view through the device in the plane of the optoelectronic chip and optical fibre. For clarity, the external feed-through, strain relief collar and a protective tube (shown in FIG. 1) have been omitted from FIG. 2.

There remains a need for an optoelectronic device having a reduced footprint, or which facilitates the use of a longer optoelectronic chip within a housing having an existing footprint. In particular, there remains a need for an optoelectronic device having a reduced housing length and/or housing width, or which could facilitate the use of a longer and/or wider optoelectronic chip within an existing housing.

SUMMARY OF THE INVENTION

In accordance with one aspect of the present invention there is provided an optoelectronic device having a housing and a chip housed by the housing, wherein at least a portion of the chip protrudes through an aperture in a wall of the housing.

In accordance with another aspect of the present invention there is provided an optoelectronic module comprising an optoelectronic device, having a housing and a chip housed by the housing, wherein at least a portion of chip protrudes through an aperture in a wall of the housing, and electronic control circuitry adapted to control the operation of the optoelectronic device.

In accordance with a further aspect of the present invention there is provided a method of assembling an optoelectronic device, comprising inserting an optoelectronic chip into a housing such that at least a portion of the chip protrudes through an aperture in a wall of the housing.

Advantageously the present invention enables a package housing to be used with an optoelectronic chip that is coupled to an optical fibre, in which the footprint is smaller than would otherwise be the possible. Further, advantageously, the present invention enables a larger optoelectronic chip to be used within a package housing of a particular footprint than has previously been possible. Advantageously the protrusion of the chip out through an aperture in a wall of the housing facilitates convenient assembly of the device. Advantageously, where the chip is optically coupled with an optical fibre by a lens, the separation between the chip and lens may be provided external to the housing, thereby further reducing the length of the housing.

An optical fibre may be butt-coupled to the chip. The chip assembly may comprise an optical coupling element, and the optical coupling element may be butt-coupled to a portion of the chip that protrudes through the aperture in the wall of the housing. An external feed-through may be bonded to the wall of the housing, and the optical fibre bonded to the external feed-through. Alternatively, the order of these steps may be reversed.

An optical fibre may be optically coupled to the chip by a lens. An optical coupling element may be bonded to the optical fibre, and the optical coupling element may be optically coupled to the chip by the lens. The lens may be bonded within an external feed-through, and the external feed-through may be bonded to the wall of the housing.

The optical coupling element may be butt-coupled between the chip and the optical fibre. The optical fibre may be bonded to an external feed-through, and the external feed-through may be bonded to the wall of the housing.

The chip, or a chip assembly comprising the chip and the optical coupling element, may protrude through a further wall of the housing.

The housing may comprise a sub-mount and a main package body, and the sub-mount may be connected between the main package body and the chip.

The chip may be a lithium niobate optoelectronic modulator chip.

BRIEF DESCRIPTION OF THE DRAWINGS

For a better understanding of the present invention, and to show more clearly how it may be carried into effect, reference will now be made, by way of example only, to the accompanying drawings, in which.

DETAILED DESCRIPTION OF THE INVENTION

Figure 1:
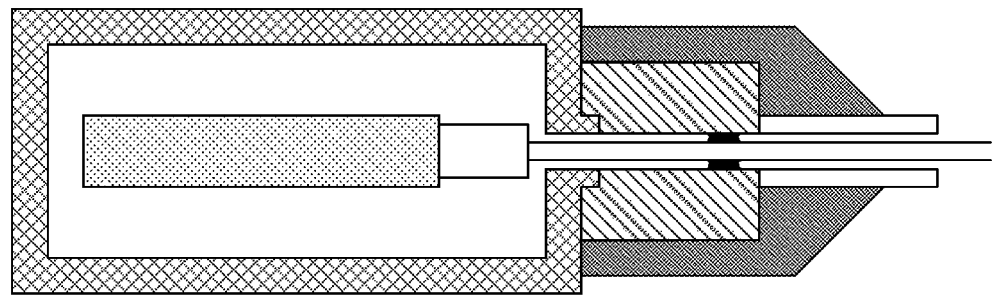
FIG. 1 illustrates a cross-sectional view of a first known optoelectronic device.
Figure 2:
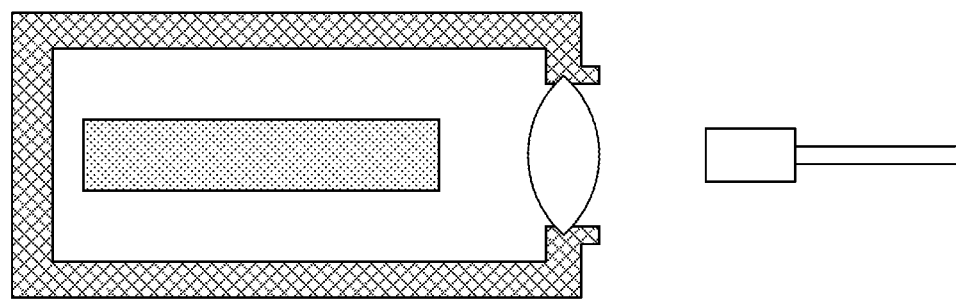
FIG. 2 illustrates a cross-sectional view of a second known optoelectronic device.
Figure 3A:
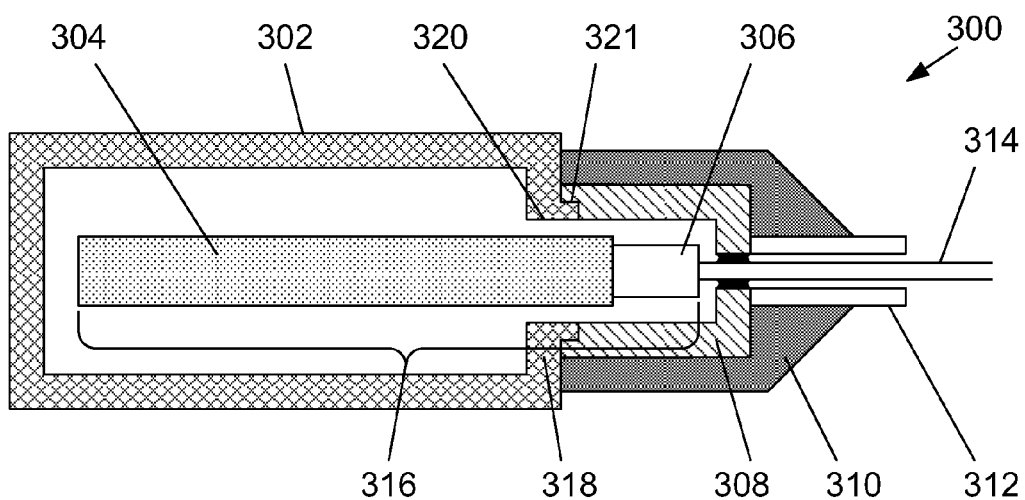
FIG. 3A illustrates a cross-sectional view of an optoelectronic device according to the present invention.
Figure 3B:
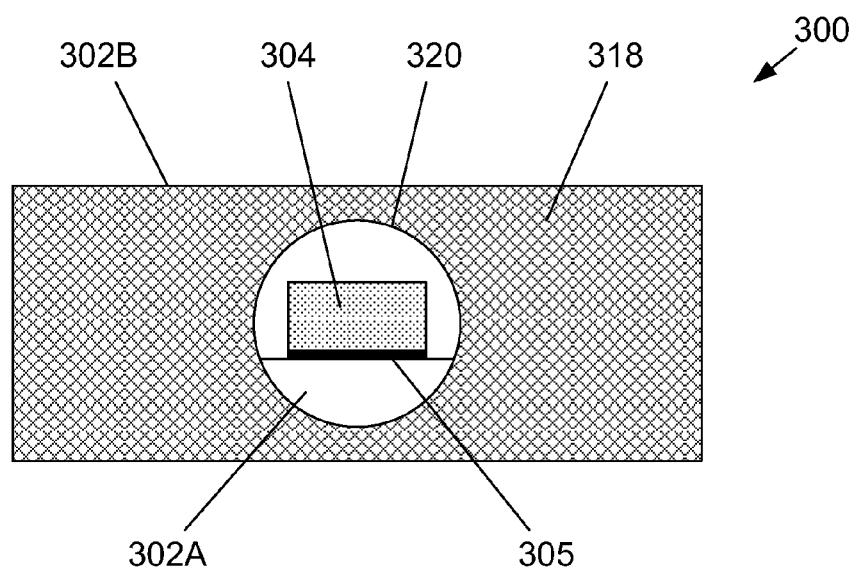
FIG. 3B illustrates another cross-sectional view of the optoelectronic device of FIG. 3A.

FIGS. 3A and 3B illustrate an optoelectronic device 300 in accordance with the invention. FIG. 3A illustrates the device 300 in cross-sectional view in the plane of an optoelectronic chip, and FIG. 3B illustrates a cross-sectional view of the device 300 in a plane perpendicular with the plane of the chip and within the thickness of the end wall of the housing.

The device 300 comprises an optoelectronic package housing 302, an optoelectronic chip 304, resin 305, an optical coupling element 306, an external feed-through 308, a strain relief collar 310 and a protective tube 312. The device 300 is provided with an optical fibre 314.

The package housing 302 is composite, with the chip 304 being bonded to a sub-mount 302A by resin 305. The sub-mount 302A is in turn connected (e.g. bonded) to a main package body 302B adapted to receive the sub-mount. In particular, a stainless-steel sub-mount may be used with a Kovar® main package, in the case of a lithium niobate chip, since the lithium niobate is more closely matched to the coefficient of thermal expansion of stainless-steel than Kovar®.

The optical coupling element 306 is bonded to the chip 304 to form a chip assembly 316. The bonding also provides optical coupling between the optical coupling element 306 and the chip 304. The bond between the optical coupling element 306 and the chip 304 is formed with optically transparent resin (not shown). The optical coupling element 306 is borosilicate glass, but other suitable materials alternatively may be used.

The wall 318 of the housing 302 has an aperture 320, and the chip assembly 316 protrudes out through the aperture from within the housing. In particular, the chip 304 protrudes through the aperture 320 from within the housing 302. The aperture 320 is substantially cylindrical or part-cylindrical in shape.

The external feed-through 308 is advantageously metal and adapted to fit onto an alignment feature 321 of the wall 318 of the housing 302. The feed-through 308 is sealed to the housing 302 with resin. Alternatively, advantageously the feed-through may be soldered to the housing, providing a hermetic seal, or fixed using laser welding. The feed-through 308 may be composed of different pieces assembled together and assembled to the housing. In certain circumstances the feed-through 308 may be made from an alternative material such as plastic, especially if hermeticity is not required.

The external feed-through 308 is adapted to receive both the part of the chip assembly 316 that protrudes from within the housing 302 and the end portion of the optical fibre 314. Advantageously, the protrusion of the chip assembly 316 from within the housing, and into the feed-through, enables the use of a longer chip 304 (or chip assembly) or a shorter package housing 302 than would be the case were the entire chip assembly contained within the housing. Space is commonly at a premium within optoelectronic applications, such as telecommunications transponder modules, and the ability to house a longer chip within an optoelectronic device housing is highly advantageous.

Where the packaged device 300 comprises an optical coupling element 306, the optical coupling element is conveniently provided pre-bonded onto the end of the optical fibre 314. The optical coupling element 306 is more conveniently handled by the alignment apparatus than the end of the optical fibre 314. The optical coupling element 306 is bonded to the chip 304 with optical resin, such that the optical fibre is optically coupled with an optical waveguide (not shown) of the chip.

Advantageously, the protrusion of the chip assembly 316 through the aperture 320 from within the package housing 302 facilitates convenient assembly of the device 300. In particular, due to the protrusion of the chip assembly 316 clear of the housing 302, during alignment and bonding of the optical coupling element 306 (or the end of the optical fibre 314) to the chip 304, the optical coupling element (or the end of the fibre) can be handled by the alignment apparatus outside of the housing 302, providing convenient access for holding and manoeuvring of the fibre end or coupling element by the alignment apparatus. In contrast, in the case of existing devices, it is necessary for the alignment apparatus to handle the end of the fibre or the optical coupling element within the package housing, placing limits on the dimensions of the alignment apparatus and the housing, to permit access of the alignment apparatus into the housing.

In an alternative embodiment of the present invention, the packaged device may omit the provision of the optical coupling element. Accordingly, in contrast to FIG. 3, in such a device the optical fibre is bonded directly to the chip, and the fibre is aligned to optically couple to the optical waveguide of the chip.

The optical fibre 314 is fed through the feed-through 308. The optical fibre 314 is sealed within the feed-through 308 with resin. Alternatively, advantageously, the optical fibre may be sealed to the feed-through with solder to provide a hermetic seal. Where the part of the optical fibre that is within the feed-through is metallised, metal solder may be used to form the seal between the optical fibre and the feed-through. Alternatively, a glass solder may be used to form the seal between the optical fibre and the feed-through.

The strain relief collar 310 fits over the feed-through 308 and advantageously abuts the wall 318 of the housing 302. The collar is held in place by a friction fit to the feed-through. Alternatively, or additionally, the collar may be mechanically retained on the feed-through by engagement with a retention feature of the feed-through and/or the wall of the wall of the housing. The strain-relief collar is manufactured from a resiliently deformable material, e.g. natural or synthetic rubber.

The optical fibre 314 passes within the strain relief collar 310, through an aperture adapted to receive an end of the protective tube 312. The feed-through 308 is provided with a receiving feature into which the protective tube 312 is received. The receiving feature is a recess into which the protective tube is held in place by a friction fit to the feed-through. Alternatively, or additionally, the protective tube 312 may mechanically engage with a retaining feature of the feed-through. The protective tube is manufactured from a resiliently deformable material.

The strain relief collar 310 and the protective tube 312 provide protection to the optical fibre 314. In particular the collar 310 provides protection at the point where the fibre enters the feed-through 308, where it is particularly vulnerable to damage.

In an alternative embodiment, the chip 304 is directly bonded to a housing 302, without the requirement for a sub-mount. In particular, a lithium niobate optoelectronic chip may be directly bonded to a stainless steel housing.

Alternatively to directly bonding the chip to the package housing or a sub-mount, the chip may be bonded to a temperature control device (e.g. a thermo-electric (Peltier) cooler), which is in turn bonded to the package housing or sub-mount.

Figure 4:
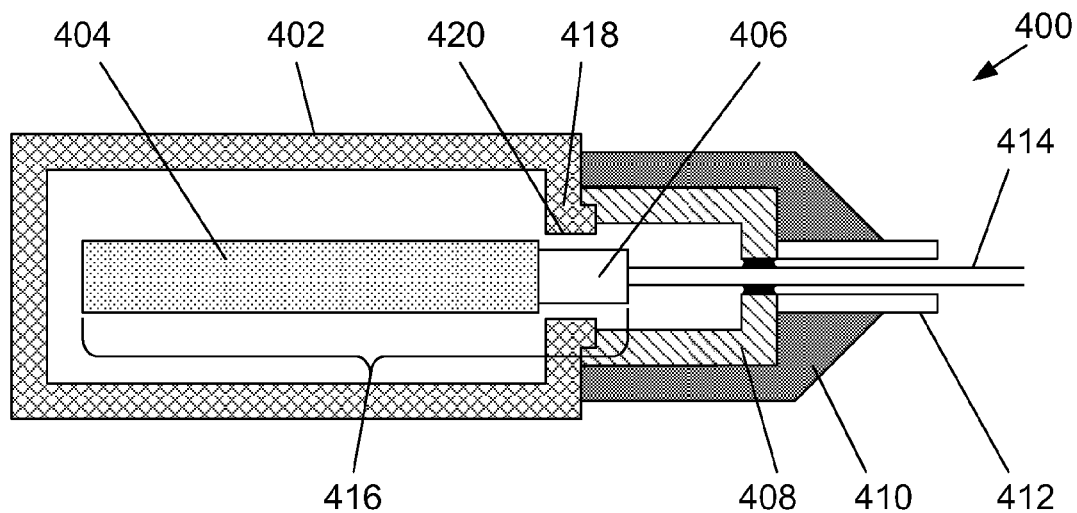
FIG. 4 illustrates a cross-sectional view of an optoelectronic device according to the present invention.

FIG. 4 illustrates a further optoelectronic device 400 in accordance with the invention. For convenience, the component parts of optoelectronic device 400 that are, in effect, equivalent to corresponding parts of the device shown in FIG. 3 are identified by the same reference numerals incremented by 100. Thus the optoelectronic chip illustrated in FIG. 4 is denoted by reference numeral 404, as compared to chip 304 in FIG. 3.

The end wall 418 of the housing 402 has an aperture 420, and the chip assembly 416 protrudes out through the aperture from within the housing. In particular, that part of the chip assembly 416 comprised by the optical coupling element 406 protrudes out through the aperture 420 from within the housing 402. In contrast with the embodiment of the invention illustrated in FIG. 3, that part of the chip assembly 416 comprised by the chip 404 does not protrude out through the aperture 420.

Figure 5:
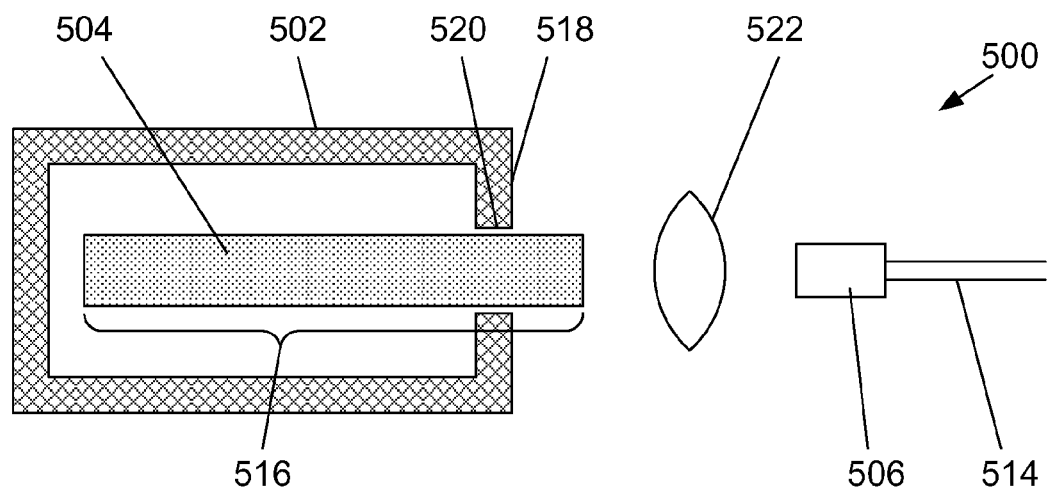
FIG. 5 illustrates a cross-sectional view of an optoelectronic device according to the present invention.

FIG. 5 illustrates a further optoelectronic device 500 in accordance with the invention. For the purposes of clarity, the external feed-through, strain relief collar and protective tube are omitted from FIG. 5. For convenience, the component parts of optoelectronic device 500 which are, in effect, equivalent to corresponding parts in the device shown in FIG. 3 are identified by the same reference numerals incremented by 200. Thus the optoelectronic chip illustrated in FIG. 5 is denoted by reference numeral 504, as compared to chip 304 in FIG. 3.

The wall 518 of the housing 502 has an aperture 520, and the chip assembly 516 protrudes out through the aperture from within the housing. In particular, the chip assembly 516 comprises the chip 504, and it is the chip that protrudes out through the aperture 520 in the wall 518 of the housing 502.

The optical coupling element 506 is bonded and optically coupled to the optical fibre 514. The chip 504 is optically coupled to both the optical coupling element 506 and the optical fibre 514, in an air-lens alignment arrangement, by means of the lens 522. The lens 522 is bonded within the external feed-through. Alternatively, the chip may be optically coupled to both the optical coupling element and the optical fibre, in an air-lens alignment arrangement, by means of an optical system comprising a plurality of lenses and/or other optical components.

In assembly of the optoelectronic device 500, the chip 504 is connected to the package housing 502, and the feed-through (with its integral lens 522) is bonded to the wall 518 of the housing. The optical coupling element 506 is "actively aligned" during optoelectronic operation of the chip 504, such that the optical coupling element 506 is bonded to the external feed-through in such a position that the optical signal coupled between the chip 504 and the optical fibre 514 is maximised. For example, where the chip 504 has an optical waveguide (not shown) comprising a Mach-Zehnder modulator, light transmitted from a laser is passed through the chip 504 whilst the optical coupling element 506 is aligned with respect to the chip, and bonded into the external feed-through.

The chip assembly of an optoelectronic device according to the invention may also protrude out through a second wall of the package housing. Accordingly, where an optoelectronic chip assembly is optically coupled to optical fibres at opposite ends of the chip, those opposite ends of the chip assembly may both protrude out through walls at opposite ends of the housing. Advantageously such an arrangement enables a further reduction in the length of the housing for such an optoelectronic chip.

Figure 6:
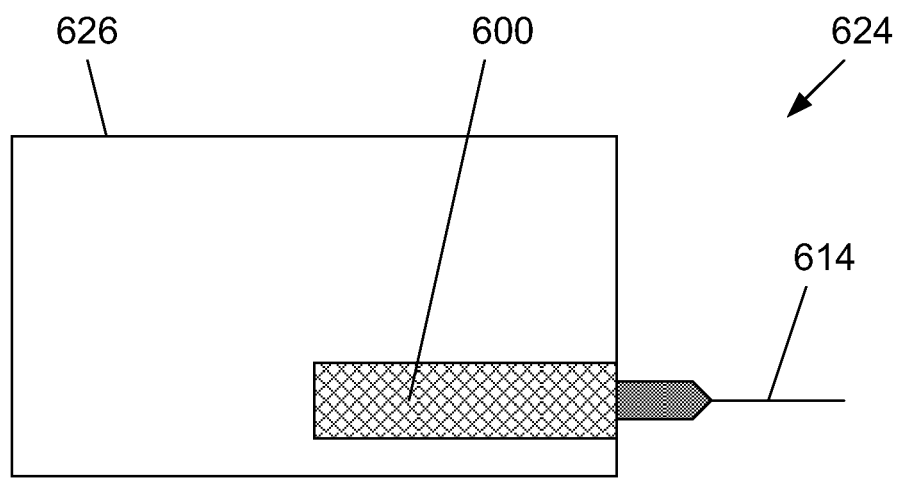
FIG. 6 illustrates a plan view of an optoelectronic module according to the present invention.

FIG. 6 illustrates an optoelectronic module 624 in accordance with the invention. The module 624 comprises an optoelectronic device 600 mounted on a sub-mount 626. The optoelectronic device 600 is one of the optoelectronic devices 300, 400 and 500 of FIGS. 3, 4 and 5. The sub-system 626 is provided with electronic control circuitry for operating the optoelectronic device 600. In particular, the electronic control circuitry provides electrical operating signals to optoelectronic elements in the optical waveguide of the optoelectronic chip. For example, where the optoelectronic chip is a lithium niobate Mach-Zehnder modulator, the electrical operating signals control electrical biases the electrodes associated with the optical waveguide.

The invention claimed is:

1. An optoelectronic device having a housing and a chip assembly, the chip assembly comprising an optoelectronic chip housed by the housing, and an optical coupling element, wherein at least a portion of the chip assembly which does not comprise the optoelectronic chip protrudes from within the housing through an aperture in a wall of the housing, wherein an optical fibre is bonded by being butt-coupled to the portion of the chip assembly that protrudes through the aperture in the wall of the housing, and the optical coupling element is bonded by being butt-coupled to the optoelectronic chip, wherein the optoelectronic chip is coaxially positioned with the optical coupling element.

2. The device according to claim 1, wherein the optical fibre is bonded to an external feed-through, and the external feed-through is bonded to the wall of the housing.

3. The device according to claim 1, wherein the housing comprises a sub-mount and a main package body, and the sub-mount is connected between the main package body and the optoelectronic chip.

4. The device according to claim 1, wherein the optoelectronic chip is a lithium niobate modulator.

5. An optoelectronic module comprising an optoelectronic device according to claim 1 and electronic control circuitry adapted to control the operation of the optoelectronic device.

6. A method of assembling an optoelectronic device, comprising inserting a chip assembly comprising an optoelectronic chip and an optical coupling element into a housing such that at least a portion of the chip assembly which does not comprise the optoelectronic chip protrudes from within the housing through an aperture in a wall of the housing and bonded by butt-coupling an optical fibre to the portion of the chip assembly protruding through the aperture in the wall of the housing and bonding by butt-coupling the optical coupling element to the optoelectronic chip, wherein the optoelectronic chip is coaxially positioned with the optical coupling element.

7. The method according to claim 6, further comprising bonding an external feed-through to the wall of the housing, and bonding the optical fibre to the external feed-through.

\* \* \* \* \*